(12) United States Patent
Lazarev et al.

(10) Patent No.: US 6,847,420 B2
(45) Date of Patent: Jan. 25, 2005

(54) LIQUID CRYSTAL DISPLAY WITH REFLECTING POLARIZER

(75) Inventors: Pavel I. Lazarev, Belmont, CA (US); Michael V. Paukshto, Foster City, CA (US); Ma Yao-Dong, San Jose, CA (US)

(73) Assignee: Optiva, Inc., South San Francisco, CA (US)

( * ) Notice: Subject to any disclaimer, the term of this patent is extended or adjusted under 35 U.S.C. 154(b) by 33 days.

(21) Appl. No.: 10/241,068

(22) Filed: Sep. 10, 2002

(65) Prior Publication Data

US 2003/0071939 A1 Apr. 17, 2003

(30) Foreign Application Priority Data

Sep. 21, 2001 (RU) ........................................ 2001125727

(51) Int. Cl.[7] ............................................. G02F 1/1335
(52) U.S. Cl. ........................ 349/96; 349/105; 359/498
(58) Field of Search .......................... 349/96, 104, 105; 359/490, 497, 483, 487

(56) References Cited

U.S. PATENT DOCUMENTS

| | | | |
|---|---|---|---|
| 3,610,729 A | 10/1971 | Rogers | |
| 5,007,942 A | 4/1991 | Claussen et al. | |
| 5,528,400 A | 6/1996 | Arakawa | |
| 6,088,159 A | 7/2000 | Weber et al. | |
| 6,122,079 A | 9/2000 | Branca, Jr. et al. | |
| 6,207,260 B1 * | 3/2001 | Wheatley et al. | 428/212 |
| 6,307,676 B1 | 10/2001 | Merrill et al. | |
| 6,399,166 B1 | 6/2002 | Khan et al. | |
| 6,420,001 B1 | 7/2002 | Coates et al. | |
| 6,466,297 B1 | 10/2002 | Goulding et al. | |
| 6,573,961 B2 * | 6/2003 | Jiang et al. | 349/115 |
| 6,574,044 B1 | 6/2003 | Sahouani et al. | |

FOREIGN PATENT DOCUMENTS

| | | |
|---|---|---|
| EP | 246842 A2 | 11/1987 |
| EP | 0961138 A1 | 1/1999 |
| JP | 04-161978 | 6/1992 |
| WO | WO95/17691 | 6/1995 |
| WO | WO 97/39380 | 10/1997 |
| WO | WO 99/08140 | 2/1999 |
| WO | WO 99/31535 | 6/1999 |
| WO | PCT/US02/30008 | 9/2002 |

OTHER PUBLICATIONS

T. Alfrey, Jr. et al., "Physical Optics of Iridescent Multilayered Plastic Films", Polymer Engineering And Science, Nov., 1969, vol. 9, No. 6, pp. 400–404.

G. King et al., "Multi–Layer Thin Crystal Film for Color Reflective LCD", Optiva, Inc., Asia Display / IDW, pp. 497–499, Oct. 16, 2001.

G. King et al., "Reflective E–Type Nano–Film Polarizers", Optiva, Inc., pp. 1–4, Feb. 17, 2002.

(List continued on next page.)

Primary Examiner—Kenneth Parker
(74) Attorney, Agent, or Firm—Dorsey & Whitney LLP

(57) ABSTRACT

A liquid crystal display is provided which comprises front and rear panels, and electrodes, polarizers and a layer of liquid crystal disposed between the front and rear panels. The polarizer on the rear panel is preferably a reflecting type in at least one region of the spectrum and contains at least one element in the form of a multilayer structure. The multilayer structure contains at least two anisotropic layers separated by at least one intermediate layer which is optically transparent in the desired spectral region. The ratio of refraction indices and thickness of the layers in the multilayer structure is chosen such to provide an extremum for the ratio of the transmitted and reflected polarized light in the spectral region.

23 Claims, 2 Drawing Sheets

OTHER PUBLICATIONS

G.D. Sharp et al., "Retarder Stack Technology for Color Manipulation", Sid Symposium, Apr. 1999, vol. 30, p 1072, pp. 1–4.

Michael F. Weber et al., *"Giant Birefringent Optics in Multilayer Polymer Mirrors"*, Research Article, Science, Mar. 31, 2000, vol. 287, pp. 2451–2456.

P. Lazarev, M. Paukshto, "Thin Crystal Film Retarders", IDW '00 Conference Proceedings, Dec. 2000, Japan, 2 pages.

Beneson W. et al., "Handbook of Physics", NY 2000, 1 page.

V.G. Chigrinov, "Liquid Crystal Devices: Physics and Applications", 1999, pps.226–231.

L.K. Vistin, "Up–to–date Application of a Liquid Crystal", Magazine of Mendeleev All–Union Chemical Society, 1983, vol. XXVIII, #2, pps. 141–148.

Pochi Yeh, Claire Gu, "Optics of Liquid Crystal Displays", 6 pages.

Japanese Publication (un–translated).

Translation of Japanese Publication: Nikkei Electronics, 1983, 5–23, pp. 102–103).

* cited by examiner

LIQUID CRYSTAL DISPLAY WITH REFLECTING POLARIZER

FIELD OF THE INVENTION

The present invention relates generally to devices of displaying information, and in particular to liquid crystal displays (LCDs).

BACKGROUND OF THE INVENTION

There are known displays embodied in flat cells. A cell is usually formed by two parallel glass plates, on the inner sides of which are electrodes made from optically transparent conducting materials, and alignment layers. After assembly of the cell, the cell is filled with a liquid crystal material which forms a layer having thickness ranging from 5 to 20 $\mu$m. The liquid crystal material is an active medium that changes its optical properties such as angle of rotation of polarization plane under the influence of an electric field. Variations of optical properties are viewed in the crossed polarizers, which are usually glued on the external surfaces of the cell. The areas of the display where electrodes are not electrically charged transmit light and look bright, while the areas under voltage look dark (L. K. Vistin. JVHO, 1983, vol. XXVII, ed. 2, pp. 141–148).

In reflecting displays, a mirror or reflector is provided behind the LC cell so that the incident light passes through the cell twice. Formation of an image is performed analogously to the transmission displays (Pochi Yeh, Claire Gu, Optics of Liquid Crystal Displays, N.- Y., 1999, pp. 233–237).

The main drawback of traditional displays is the small viewing angle since only the light flow propagating towards the front surface of the multilayer LC display within the limits of a confined cone angle efficiently governs the multilayer design of the LC display. Such displays usually use absorbing polarizers based on a polymer such as polyvinyl alcohol having optical anisotropy, which can be obtained via monoaxial stretching of the film of this polymer as described in U.S. Pat. No. 5,007,942, and subsequent dyeing of the film in iodine fumes or in an organic dye. Thus the ellipsoids of angular dependence of the real and imaginary parts of refraction index of the polarizer have stretched-out (needle-like) shape.

The traditional displays also have relatively low brightness, low contrast and high power consumption due to the large number of absorbing layers.

Color displays usually have the same design wherein color filters are used. Each pixel of a color image is formed via mixing of three colors (red, blue and green) in a proper ratio (Nikkei Electronics, 1983,5–23, p.p. 102–103). Using absorbing filters may cause additional light losses in the device and as a consequence increase energy consumption.

There are known LC displays where the polarizer layer is obtained from aligned supramolecular complexes of a dichroic dye. Such polarizers have high optical characteristics and small thickness, which allows their placement inside the display. This simplifies the design and increases durability of the display. In addition, the fabrication technology of such layers allows combining several functions in a single layer (for example the function of polarizer and LC alignment layer) (RU 2120651, 15.04.96).

WO 99/31535 describes a liquid crystal display which incorporates a polarizer containing a birefringent anisotropically absorbing layer having a refraction index that increases with the increase of the wavelength of incident light. In particular, such polarizer may be obtained from LLC dichroic dye and may have certain thickness to establish interference extremum on at least one side of the polarizer. The above noted patent application also describes a reflecting polarizer.

One of the drawbacks of using such polarizers for color display is that they reflect light in a wide spectral range which leads to smeared colors. In addition, further development of display technology requires better optical characteristics of polarizing elements, particularly increased viewing angle at which there is an efficient light transformation.

SUMMARY OF THE INVENTION

Accordingly, one object of the present invention is to provide a display that has increased display brightness, spectrally clean color images, and is capable of creating white, black and color components in color image to increase the contrast and richness of the image, and has increased viewing angle of the display.

These and other objects are achieved by the liquid crystal display of the present invention which comprises front and rear panels with electrodes and polarizers and a layer of liquid crystal disposed between the front and rear panels. The polarizer on the rear panel is a reflecting type preferably in at least one region of spectrum and contains at least one element in form of a multilayer structure. The multilayer structure contains at least two anisotropic layers separated by at least one intermediate layer which is optically transparent in the desired spectral region. The ratio of refraction indices and thickness of the layers in the multilayer structure is chosen such to provide an extremum for the ratio of transmitted and reflected polarized lights in the spectral region.

BRIEF DESCRIPTION OF DRAWINGS

The invention will be better understood from the following description when read in connection with the accompanying drawings, in which.

DESCRIPTION OF THE PREFERRED EMBODIMENTS

Figure 1:
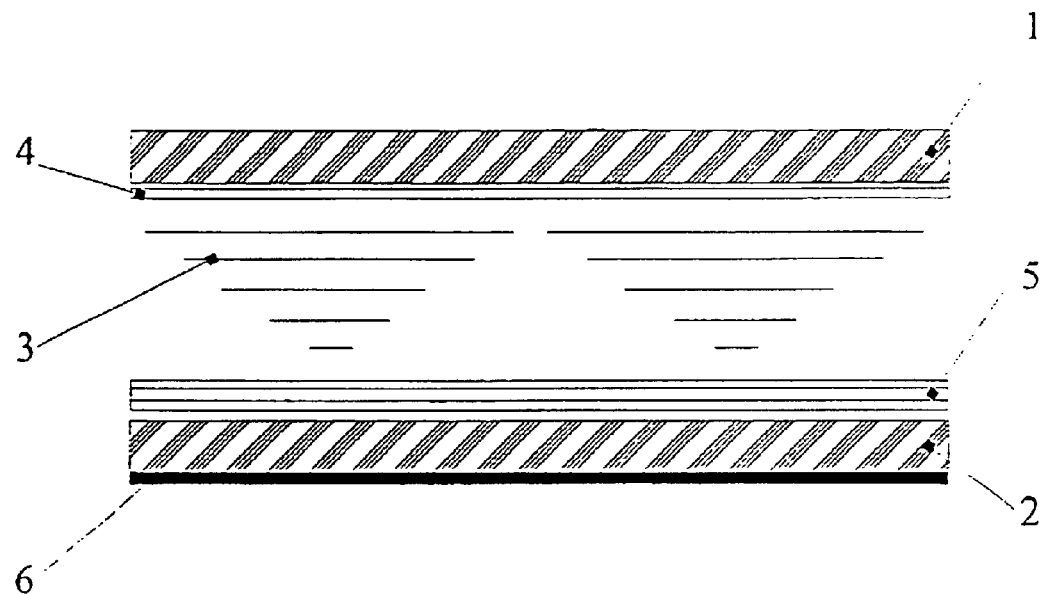
FIG. 1 is a schematic sectional view of a liquid crystal display having internal polarizers according to one embodiment of the present invention.

The LC display of the present invention shown in FIG. 1 includes front and rear panels 1 and 2 with functional layers such as electrodes, planarization layer, adhesion layer and a layer of liquid crystal 3 disposed between the front and rear panels. On the inner side of the front panel 1 is a thin crystalline film 4 functioning as a dichroic polarizer. The crystalline film 4 may be formed according to the method described below from LLC containing 12.5% mixture of dyes (Vat Blue 4; bis-benzimidazole-[2,1-a:1'2'b']anthra[2,1,9-def:6,5,10-d'e'f']diisoquinoline-6,9-dion; Vat Red 15 in the ratio 5.2:2:1). The LLC is transferred into an insoluble from after being treated with Barium ions. The thickness of the crystalline film 4 is about 100 nm. Since the crystalline film 4 is a highly ordered anisotropic film, it may simultaneously work as an alignment layer for the liquid crystal.

On the internal surface of the rear panel 2 is provided a reflecting polarizer 5 having a multilayer structure. The rear panel 2 is also provided with an absorbing layer 6 on the outer surface of the rear panel 2.

Figure 2:
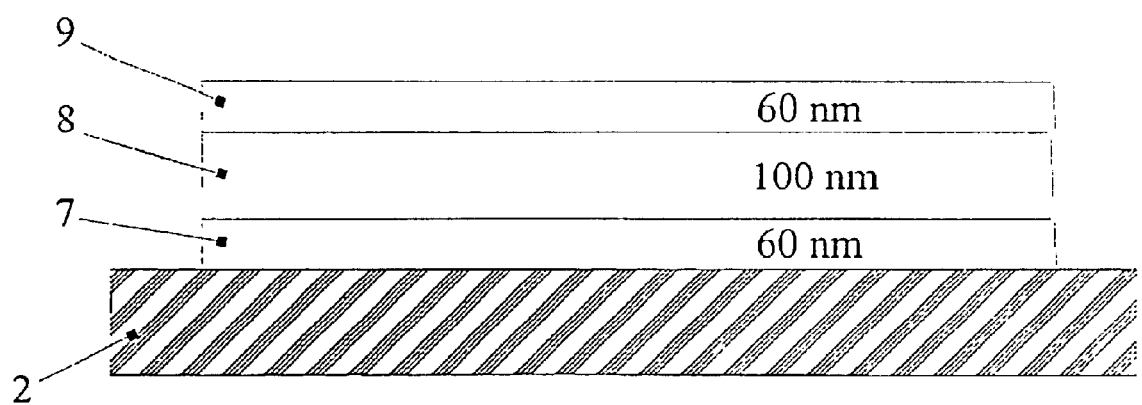
FIG. 2 is a partial sectional view of the liquid crystal display of FIG. 1 showing the details of a multilayer reflecting polarizer.
Figure 3:
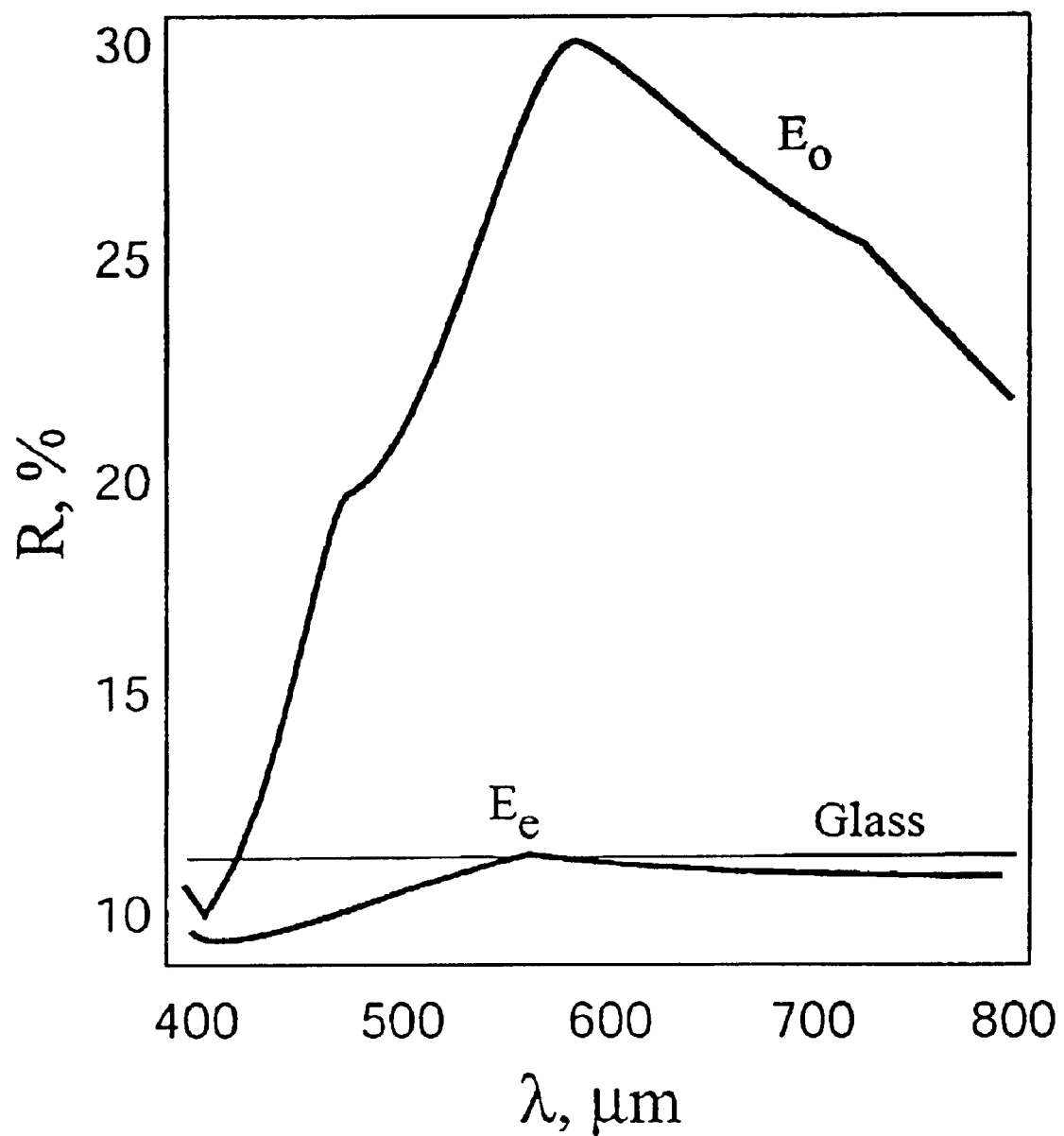
FIG. 3 is a graph illustrating spectral characteristics of the liquid crystal display according to one embodiment of the present invention.

The reflecting polarizer 5 consists of three layers as shown in FIG. 2: starting from the rear panel 2 of the display, a crystalline layer 7 obtained from LLC of dye Vat Red 15, which is about 60 nm thick, an isotropic transparent layer 8 of polyvinylacetate, which is about 100 nm thick, and a crystalline layer 9 obtained from LLC of dye Vat Red 15, which is about 60 nm thick. Crystalline layers 7 and 9 are distinct by their high degree of anisotropy: in the wavelength interval 570–600 nm it reaches 0.8. Layers 7, 8, and 9 are formed on the rear panel 2 sequentially by the method as described below. Reflecting polarizer 5 has integral reflecting efficiency of about 44% of polarized light for extraordinary direction and about 1% for ordinary direction. FIG. 3 shows corresponding spectral characteristics of the reflected light for different directions of polarization.

The display features bright images, rich color (green), high contrast and wide viewing angle.

Preferably at least one anisotropic layer of the multilayer structure 5 is optically transparent in the mentioned region of spectrum for both components of polarization.

It is preferred that at least one anisotropic layer has degree of anisotropy no less than 0.4 in the desired spectrum region.

Preferably at least one anisotropic layer of the multilayer structure 5 is a polarizer of E-type in at least one region of the spectrum.

The anisotropic layers are usually obtained from at least one organic dye and/or derivatives thereof, which are capable of forming lyotropic liquid crystal (LLC).

It is preferred that at least one of the polarizers is disposed between the front and rear panels of the display.

Preferably an absorbing layer 6 absorbing in at least the desired spectrum region or in the entire visible wavelength range is provided on the outer surface of the rear panel 2 along the direction of the incident light.

It is preferred that at least one anisotropic layer in the display is at least partially crystalline.

In a color display, the polarizer 5 on the rear panel 2 preferably consists of a matrix of color reflecting elements, each of which reflects in at least one region of the spectrum. The choice of matrix elements is governed by the conditions to provide a set of basic colors. Usually, the basic colors are blue with wavelength in the range 400–500 nm, green with wavelength in the range 500–600 nm and red with wavelength in the range 600–700 nm.

Preferably the absorbing layer 6 disposed on the rear panel 2 behind the polarizer consisting of a matrix of colored reflecting elements absorbs in the entire visible wavelength range.

The display includes white, black and colored components in the color image.

The LC display according to the present invention contains front and rear panels, and electrodes, polarizers and other functional layers disposed on the front and rear panels, and a layer of liquid crystal between the front and rear panels. The polarizer on the front panel is preferably neutral, transmitting one polarized component of light and efficiently absorbing the other.

The polarizer on the rear panel in a monochromatic display represents a multilayer structure containing at least two optically anisotropic layers separated by an optically transparent intermediate layer. The thickness and refraction indices of all layers are selected such that the polarizer efficiently reflects radiation of one polarization in certain region of the spectrum and transmits orthogonally polarized radiation, which is later absorbed by the filters.

In a color display, the polarizer on the rear panel represents a matrix of color reflecting elements, each of which is implemented analogously to the reflecting polarizer described above for the monochromatic display. The choice of matrix elements is governed by the condition to provide a set of basic colors in the image. In order to obtain spectrally clean, high contrast color images, it is preferred that each matrix element reflects in a narrow spectral range.

In fabrication of the multilayer structure 5 which efficiently reflects light of one polarization, it is preferably to obtain homogeneous layers with high degree of anisotropy, high value of one of the refraction indices and preferably thin (comparable to the wavelength). Crystalline films or layers obtained according to methods of Optiva technology (Lazarev P., Paukshto M., Proceeding of the $7^{th}$ International Display Workshops, Materials and Components, Kobe, Japan, November 29–December 1 (2000), pp. 1159–1160) can be used in fabrication of the multilayer structure 5.

Initial choice of the materials for fabricating such multilayer structure is based on suitable spectral characteristics and the presence of developed system of π-conjugate bonds in the aromatic conjugate cycles and groups such as amine, phenol, ketone and others, laying in the planes of molecules and being a part of the aromatic bond system. The molecules themselves or their fragments have flat structure. Suitable organic materials include indanthrone (Vat Blue 4), dibenzoimidazol 1,4,5,8-naphthalenetetracarboxilic acid (Vat Red 14), dibenzoimidazole 3,4,9,10-perylentatracorboxilic acid, quinacridone (Pigment Violet 19), or other materials. The derivatives of the above listed materials or their mixtures form stable lyotropic liquid crystal phase.

Dissolving such organic compounds in a suitable solvent creates a colloid system (liquid crystal solution), where molecules unite into supramolecular complexes, which function as the kinetic units of the system. LC is the pre-ordered state of the system, from which, during alignment of the supramolecular complexes and subsequent removal of the solvent, immerges the anisotropic crystalline film (or in other terminology crystal film).

The method of preparing thin anisotropic crystalline films from the colloid system with supramolecular complexes involves the following steps:

depositing the colloid system onto a substrate (or a ware, or one of the layers of the multilayer structure). The colloid system possesses thixotropic properties for which the colloid system must be at a certain temperature and have certain concentration of the dispersion phase;

converting the deposited or the depositing colloid system into a state of increased fluidity via any suitable external impact to provide a decreased viscosity of the system (this may be heating, deformation by shearing etc.). The external impact may continue during the entire subsequent process of alignment or have the necessary duration so that the system does not return to a state with increased viscosity during alignment;

applying an external orienting force on the system, which may be implemented mechanically as well as with any other method. The force must be sufficient so that the to kinetic units of the colloid system receive necessary orientation and form the structure, which will be the basis for the future crystal lattice in the resulting layer;

converting the oriented region of the resulting film from the state with lowered viscosity, which is achieved with the primary external influence, into the state with the original or higher viscosity of the system. This is performed in such a way that there is no disorientation of the structure in the resulting film so as to avoid appearance defects of the surface of the layer;

removing the solvent from the resulting film, during which the crystalline structure is formed.

Within the obtained layer, planes of molecules are parallel to each other and so form three-dimensional crystal in at least a part of the layer. By optimizing this method of film fabrication, monocrystalline layers can be obtained. Optical axis in such crystal will be perpendicular to the planes of molecules. Such layer will possess high degree of anisotropy and high refraction index for at least one direction. The thickness of the layer usually does not exceed 1 μm.

The thickness of the resulting film may be controlled through the content of the solid phase in the original LC and the thickness of the deposited layer of LLC. Furthermore, to obtain layers with intermediate optical characteristics, a mixture of colloid systems may be used (in this case there will be combined supramolecular complexes formed in solution). Absorption and refraction may have various values within the limits determined by the original components in the layers obtained from mixtures of colloid solutions. Mixing various colloid systems and obtaining combined supramolecular complexes is possible due to the flatness of molecules (or their fragments) and coincidence of one of the dimensions of molecules from the above-mentioned organic compounds (3.4 Å).

In the wet layer, molecules have far order along one direction due to orientation of supramolecular complexes on the substrate. During evaporation of the solvent, it appears more energetically favorable for the molecules to form three-dimensional crystalline structure.

The multilayer structure includes at least two anisotropic layers obtained by the above described method. Here, optical axes of separate anisotropic layers are usually co-directional. Reflection of light in certain spectral ranges by the polarizer may occur due to interference effect in the thin layers. The thickness of the layers and refraction indices for each direction of polarization is selected such that one polarization component of light will be efficiently reflected by this structure while the other will pass through without being reflected. To absorb the light transmitted through the multilayer structure, a layer of an all-absorbing material is provided on the outer surface of the rear panel along the direction of radiation propagation. This eliminates glare from the rear panel of the display and enhances contrast of the image. In addition, such design allows obtaining black color in the image.

Since obtained layers are thin (less than 100 nm) and the number of layers may be minimal (e.g. 3) due to high degree of anisotropy, such multilayer structure may be placed inside of the LC display.

The polarizer for the front panel may also be obtained according to the above described technology with corresponding choice of the organic materials, which forms LLC, or a mixture of materials having suitable absorption spectra. Moreover, this polarizer may also be placed inside the display.

Internal placement of all functional layers of the display reduces the size and enhances the durability of the display device, and simplifies the fabrication process of the device.

In addition, the method of fabricating anisotropic layers results in the disk-like shape of ellipsoids of angular dependence of real and imaginary parts of the refraction index. Changing the shape of the ellipsoids of the imaginary part of the refraction index significantly improves the parameters of the polarizer and its angular characteristics. Using such polarizers in a display can increase viewing angle practically up to 180°.

The polarizer on the rear panel of a color display, representing a matrix of color reflecting elements, may also be obtained according to the above described technology, for example, using masks to form local coatings. Here, layers of anisotropic materials are deposited sequentially one after the other according to the above described technology. In the regions where the coating is desired to be preserved to form local reflecting polarizing element, the coating material is transferred into the insoluble form. The rest of the area is cleaned via rinsing. Another layer of an anisotropic material is deposited on the top of the resulting layer, and the procedure is repeated. If needed, additional planarization layers may be used. Thus, the multilayer structure of the polarizer, which is the matrix of separate elements, if formed. Each element of the matrix reflects light of certain spectral range and one polarization.

A liquid crystal display has been provided. The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents

REFERENCES

L. K. Vistin. JVHO, 1983, vol. XXVII, ed.2, pp. 141–148
Pochi Yeh, Claire Gu, Optics of liquid Crystal Displays, N.-Y., 1999, p.p. 233–237
U.S. Pat. No. 5,007,942, 1991
Nikkei Electronics, 1983, 5–23, p.p. 102–103
RU 2120651, 15.04.96
WO 99/31535

We claim:

1. A liquid crystal display comprising front and rear panels, and electrodes, polarizers and a layer of liquid crystal between the front and rear panels,
   wherein the polarizer on the rear panel is a polarizer which reflects in at least one region of spectrum and contains at least one element of a multilayer structure, said multilayer structure containing at least two anisotropic layers separated by at least one intermediate layer that is optically transparent in said region of spectrum, where the ratio of refraction indices and thickness of said layers in the multilayer structure is chosen such to provide an extremum for the ratio of transmitted and reflected polarizations in said region of spectrum, and wherein at least one of the anisotropic layers is at least partially crystalline.

2. The display according to claim 1, wherein at least one of the anisotropic layers of the multilayer structure is optically transparent in said region of spectrum for both components of polarization.

3. The display according to claim 1, wherein at least one of the anisotropic layers has a degree of anisotropy no less than 0.4 in said region of spectrum.

4. A liquid crystal display comprising front and rear panels, and electrodes, polarizers and a layer of liquid crystal between the front and rear panels, wherein the polarizer on the rear panel is a polarizer which reflects in at least one region of spectrum and contains at least one element of a multilayer structure, said multilayer structure containing at least two anisotropic layers separated by at least one intermediate layer that is optically transparent in said region of spectrum, where the ratio of refraction indices and thickness of said layers in the multilayer structure is chosen such to provide an extremum for the ratio of transmitted and reflected polarizations in said region of spectrum, and wherein at least one of the anisotropic layers is a polarizer of E-type in at least one region of spectrum.

5. The display according to claim 1, wherein the anisotropic layer is made of at least one organic dye and/or derivatives thereof.

6. A liquid crystal display comprising front and rear panels, and electrodes, polarizers and a layer of liquid crystal between the front and rear panels, wherein the polarizer on the rear panel is a polarizer which reflects in at least one region of spectrum and contains at least one element of a multilayer structure, said multilayer structure containing at least two anisotropic layers separated by at least one intermediate layer that is optically transparent in said region of spectrum, where the ratio of refraction indices and thickness of said layers in the multilayer structure is chosen such to provide an extremum for the ratio of transmitted and reflected polarizations in said region of spectrum, and wherein at least one of the polarizers is placed between the front and rear panels of the display.

7. The display according to claim 1, further comprising an absorbing layer provided on the outer surface of the rear panel along the direction of propagation of incident radiation in the at least one region of spectrum.

8. The display according to claim 7, wherein the absorbing layer absorbs in all visible range of wavelengths.

9. The display according to claim 1, wherein the polarizer on the rear panel consists of a matrix of colored reflecting elements, each of which reflects in at least one region of the spectrum.

10. The display according to claim 9, wherein the elements in the matrix are chosen such to provide a set of basic colors.

11. The display according to claim 10, wherein the basic colors include blue with wavelength ranging from 400 to 500 nm, green with wavelength ranging from 500 to 600 nm and red with wavelength ranging from 600 to 700 nm.

12. The display according to any of the claims 9 through 12, further comprising an absorbing layer on the outer surface of the rear panel along the direction of incident radiation, wherein said polarizer on the rear panel consists of a matrix of colored reflecting elements, and said absorbing layer absorbs in all visible range of wavelengths.

13. The display according to claim 4 or 6, wherein at least one of the anisotropic layers of the multilayer structure is optically transparent in said region of spectrum for both components of polarization.

14. The display according to claim 4 or 6, wherein at least one of the anisotropic layers has a degree of anisotropy no less than 0.4 in said region of spectrum.

15. The display according to claim 4 or 6, wherein the anisotropic layer is made of at least one organic dye and/or derivatives thereof.

16. The display according to claim 4 or 6, further comprising an absorbing layer provided on the outer surface of the rear panel along the direction of propagation of incident radiation in the at least one region of spectrum.

17. The display according to claim 16, wherein the absorbing layer absorbs in all visible range of wavelengths.

18. The display according to claim 4 or 6, wherein the polarizer on the rear panel consists of a matrix of colored reflecting elements, each of which reflects in at least one region of the spectrum.

19. The display according to claim 18, wherein the elements in the matrix are chosen such to provide a set of basic colors.

20. The display according to claim 4 or 6, wherein the basic colors include blue with wavelength ranging from 400 to 500 nm, green with wavelength ranging from 500 to 600 nm and red with wavelength ranging from 600 to 700 nm.

21. The display according to claim 18, further comprising an absorbing layer on the outer surface of the rear panel along the direction of incident radiation, wherein said polarizer on the rear panel consists of a matrix of colored reflecting elements, and said absorbing layer absorbs in all visible range of wavelengths.

22. The display according to claim 19, further comprising an absorbing layer on the outer surface of the rear panel along the direction of incident radiation, wherein said polarizer on the rear panel consists of a matrix of colored reflecting elements, and said absorbing layer absorbs in all visible range of wavelengths.

23. The display according to claim 20, further comprising an absorbing layer on the outer surface of the rear panel along the direction of incident radiation, wherein said polarizer on the rear panel consists of a matrix of colored reflecting elements, and said absorbing layer absorbs in all visible range of wavelengths.

* * * * *